United States Patent
Feng et al.

(10) Patent No.: US 11,035,958 B2
(45) Date of Patent: Jun. 15, 2021

(54) SYSTEMS AND METHODS FOR CORRECTING A HIGH-DEFINITION MAP BASED ON DETECTION OF OBSTRUCTING OBJECTS

(71) Applicant: BEIJING DIDI INFINITY TECHNOLOGY AND DEVELOPMENT CO., LTD., Beijing (CN)

(72) Inventors: Lu Feng, Beijing (CN); Teng Ma, Beijing (CN)

(73) Assignee: BEJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 61 days.

(21) Appl. No.: 16/235,886

(22) Filed: Dec. 28, 2018

(65) Prior Publication Data

US 2020/0158875 A1 May 21, 2020

Related U.S. Application Data

(63) Continuation of application No. PCT/CN2018/115582, filed on Nov. 15, 2018.

(51) Int. Cl.
*G06K 9/00* (2006.01)
*G01S 17/89* (2020.01)
(Continued)

(52) U.S. Cl.
CPC .............. *G01S 17/89* (2013.01); *G06F 16/29* (2019.01); *G06T 7/70* (2017.01); *G06T 2207/10028* (2013.01)

(58) Field of Classification Search
CPC ........................................... G06T 2207/10028
See application file for complete search history.

(56) References Cited

U.S. PATENT DOCUMENTS 9,052,721 B1    6/2015  Dowdall et al.
10,491,885 B1*  11/2019 Hicks .................. H04N 13/275
(Continued)

FOREIGN PATENT DOCUMENTS

CN    106650640 A    5/2017
CN    107064955 A    8/2017
(Continued)

OTHER PUBLICATIONS

David Doria et al., Filling Large Holes in LiDAR Date By Inpainting Depth Gradients, Computer Vision and Pattern Recognition Workshops(CVPRW), 2012 IEEE Computer Society Conference On, Jun. 16, 2012(Jun. 16, 2012), pp. 65-72.
(Continued)

*Primary Examiner* — Oneal R Mistry
(74) *Attorney, Agent, or Firm* — Bayes PLLC (57) ABSTRACT

Embodiments of the disclosure provide systems and methods for correcting a high-definition map. The system may include a communication interface configured to receive point cloud data of a scene captured by a LiDAR. The system may further include a storage configured to store the point cloud data, and at least one processor. The at least one processor may be configured to detect at least one obstructing object from the point cloud data, and position at least one hole in the point cloud data caused by the at least one obstructing object. The at least one processor is further configured to estimate non-obstructed point cloud data for the at least one hole as if the scene was captured without the at least one obstructing object, and correct the high-definition map by repairing the received point cloud data with the non-obstructed point cloud data.

19 Claims, 5 Drawing Sheets

(51) Int. Cl.
G06F 16/29 (2019.01)
G06T 7/70 (2017.01)

(56) References Cited

U.S. PATENT DOCUMENTS

| | | | |
|---|---|---|---|
| 2013/0054187 | A1 | 2/2013 | Pochiraju et al. |
| 2017/0098323 | A1 | 4/2017 | Rogan et al. |
| 2018/0074203 | A1* | 3/2018 | Zermas ................ G01S 17/89 |
| 2018/0075618 | A1 | 3/2018 | Lai et al. |
| 2018/0232583 | A1* | 8/2018 | Wang .................. G01S 17/89 |
| 2018/0232868 | A1 | 8/2018 | Ito et al. |
| 2018/0255465 | A1 | 9/2018 | Priest et al. |
| 2018/0259496 | A1 | 9/2018 | McPeek |
| 2018/0299557 | A1 | 10/2018 | Yi et al. |
| 2019/0120947 | A1* | 4/2019 | Wheeler ............ G01S 7/4817 |
| 2019/0147335 | A1* | 5/2019 | Wang ................ G06N 3/0454 |
| | | | 706/20 |
| 2019/0205310 | A1 | 7/2019 | Satkunarajah et al. |
| 2019/0340775 | A1* | 11/2019 | Lee .................... G01S 17/931 |

FOREIGN PATENT DOCUMENTS

| | | |
|---|---|---|
| CN | 107301654 A | 10/2017 |
| CN | 107390681 A | 11/2017 |
| CN | 107607090 A | 1/2018 |
| CN | 108415032 A | 8/2018 |
| CN | 108734654 A | 11/2018 |
| JP | H04216487 A | 8/1992 |
| JP | 2010191066 A | 9/2010 |
| KR | 20170006505 A | 1/2017 |
| KR | 20170008505 A | 1/2017 |
| KR | 20180059188 A | 6/2018 |
| WO | 2017/157967 A1 | 9/2017 |
| WO | 2018125939 A1 | 7/2018 |
| WO | 2018127789 A1 | 7/2018 |

OTHER PUBLICATIONS

Kanokphan Lertniphonphan et al., 2D to 3D Label Propagation for Object Detection in Point Cloud, 2018 IEEE Internation Conference on Multimedia & Expo Workshops(ICMEW), Jul. 23, 2018(Jul. 23, 2018), pp. 1-6.
P. Biasutti et al., Disocclusion of 3D LiDAR Point Clouds Using Range Images, ISPRS Annals of Photogrammetry, Remote' Sensing and Spatial Information Sciences, vol. IV-1/W1, May 30, 2017 (May 30, 2017), pp. 75-82.
The extended European search report in European Application No. 18819306.4 dated Dec. 20, 2019, 10 pages.
International Search Report in PCT/CN2018/115582 dated Aug. 21, 2018, 5 pages.
Written Opinion in PCT/CN2018/115582 dated Aug. 21, 2018, 4 pages.
First Examination Report in Australian Application No. 2018286592 dated Nov. 8, 2019, 8 pages.
Office Action in Canadian Application No. 3028599 dated Apr. 20, 2020, 4 pages.
Examination Report No. 3 issued in corresponding Australian Patent Application No. 2018286592, dated Sep. 30, 2020, 8 pages.
Examination Report No. 4 issued in corresponding Australian Patent Application No. 2018286592, dated Nov. 2, 2020, 10 pages.
Carlos, Fernandez, et al., "A Hybrid Vision-Map Method for Urban Road Detection" Journal of Advanced Transportation, vol. 2017, Article ID 7090549, Published Oct. 30, 2017, 22 pages.
Carlos, Fernandez, et al., "High-Level Interpretation of Urban Road Maps Fusing Deep Learning-Based Pixelwise Scene Segmentation and Digital Navigation Maps" Journal of Advanced Transportation, vol. 2018, Article ID 2096970, Published Oct. 11, 2017, 16 pages.
Doria, David et al., "Filling Large Holes in LiDAR Data By Inpainting Depth Gradients", 2012 IEEE Computer Society Conference on Computer Vision and Pattern Recognition Workshops. IEEE, 2012, 8 pages.
Becker, Jacob et al., "LiDAR Inpainting from a Single Image", 2009 IEEE 12th International Conference on Computer Vision Workshops, ICCV Workshops. IEEE, 2009, 8 pages.
Javanmardi, Mandi et al., "Towards High-Definition 3D Urban Mapping: Road Feature-Based Registration of Mobile Mapping Systems and Aerial Imagery", Remote Sensing, vol. 9, No. 10, published Sep. 21, 2017, 30 pages.
Oliveira, H.C., et al., "Occlusion Detection by Height Gradient for True Orthophoto Generation, Using LiDAR Data", International Archives of the Photogrammetry, Remote Sensing and Spatial Information Sciences, vol. XL-1/W1, ISPRS Hannover Workshop 2013, May 21-24, 2013, Hannover, Germany, 6 pages.
Truong, Quoc Hung, "Knowledge-based 3D point clouds processing" Traitement 3D de nuages de points bas'e sur la connaissance, Thèse de Doctorat, Nov. 15, 2013, 134 pages.
Yalcin, O. et al., "Approaches of Road Boundary and Obstacle Detection Using LiDAR", Preprints of the 1st IFAC Workshop on Advances in Control and Automation Theory for Transportation Applications, IFAC Proceedings vols. 46, No. 25, Sep. 16-17, 2013. Istanbul, Turkey, 5 pages.
Second Office action issued in corresponding Canadian Application No. 3,028,599, dated Feb. 8, 2021, 4 pages.
Notice of Reasons for Refusal issued in corresponding Japanese Application No. 2018-568245, dated Feb. 16, 2021, 18 pages.
Doria, David et al., "Filling Large Holes in LiDAR Data by Inpainting Depth Gradients", 978-1-4673-1612-5/12/$31.00 2012 IEEE, pp. 65-72.
Lertniphonphan, Kanokphan et al., "2D to 3D Label Propagation for Object Detection in Point 7,Loud", Media Recognition Laboratory, KDDI Research, Inc., Saitama, Japan, 978-1-5386-1737-3/18/$31. 00, 2018 IEEE.

* cited by examiner

SYSTEMS AND METHODS FOR CORRECTING A HIGH-DEFINITION MAP BASED ON DETECTION OF OBSTRUCTING OBJECTS

CROSS-REFERENCE TO RELATED APPLICATION

This application is a Continuation of International Application No. PCT/CN2018/115582, filed on Nov. 15, 2018, the contents of which is incorporated herein by reference.

TECHNICAL FIELD

The present disclosure relates to systems and methods for correcting a high-definition map in the presence of obstructions in the scene, and more particularly to, systems and methods for updating a high-definition map based on detection of the obstructing objects.

BACKGROUND

Autonomous driving technology relies heavily on an accurate map. For example, accuracy of a navigation map is critical to functions of autonomous driving vehicles, such as positioning, ambience recognition, decision making and control. High-definition maps may be obtained by aggregating images and information acquired by various sensors, detectors, and other devices equipped on vehicles as they drive around. For example, a vehicle may be equipped with multiple integrated sensors such as a Light Detection And Raging system (LiDAR), a Global Positioning System (GPS) receiver, one or more Inertial Measurement Unit (IMU) sensors, and one or more cameras, to capture features of the road on which the vehicle is driving or the surrounding objects. Data captured may include, for example, center line or border line coordinates of a lane, coordinates and images of an object, such as a building, another vehicle, a landmark, a pedestrian, or a traffic sign.

In particular, a LiDAR measures distance to a target by illuminating the target with pulsed laser light and measuring the reflected pulses with a sensor. Differences in laser return times and wavelengths can then be used to construct digital three-dimensional (3-D) representations of the target. The data captured by the LiDAR is known as point cloud data. During the survey, various objects on the road may obstruct the view of the LiDAR. Since the pulsed laser light is reflected by the obstructing objects before it reaches the road, the captured point cloud data is distorted. A high-resolution map reconstructed using such distorted point cloud data cannot accurately reflect the scene captured.

Embodiments of the disclosure address the above problems by systems and methods for correcting a high-definition map based on segmentation of point cloud data and compensation of the distortion caused by obstructing objects.

SUMMARY

Embodiments of the disclosure provide a system for correcting a high-definition map. The system may include a communication interface configured to receive point cloud data of a scene captured by a LiDAR. The system may further include a storage configured to store the point cloud data, and at least one processor. The at least one processor may be configured to detect at least one obstructing object from the point cloud data, and position at least one hole in the point cloud data caused by the at least one obstructing object. The at least one processor is further configured to estimate non-obstructed point cloud data for the at least one hole as if the scene was captured without the at least one obstructing object, and correct the high-definition map by repairing the received point cloud data with the non-obstructed point cloud data.

Embodiments of the disclosure also provide a method for correcting a high-definition map. The method may include receiving, through a communication interface, point cloud data of a scene captured by a LiDAR. The method may further include detecting, by at least one processor, at least one obstructing object from the point cloud data, and positioning, by the at least one processor, at least one hole in the point cloud data caused by the at least one obstructing object. The method may also include estimating, by the at least one processor, non-obstructed point cloud data for the at least one hole as if the scene was captured without the at least one obstructing object, and correcting, by the at least one processor, the high-definition map by repairing the received point cloud data with the non-obstructed point cloud data.

Embodiments of the disclosure further provide a non-transitory computer-readable medium having instructions stored thereon that, when executed by one or more processors, causes the one or more processors to perform a method for correcting a high-definition map. The method may include receiving point cloud data of a scene captured by a LiDAR. The method may further include detecting at least one obstructing object from the point cloud data, and positioning, by the at least one processor, at least one hole in the point cloud data caused by the at least one obstructing object. The method may also include estimating non-obstructed point cloud data for the at least one hole as if the scene was captured without the at least one obstructing object, and correcting the high-definition map by repairing the received point cloud data with the non-obstructed point cloud data.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
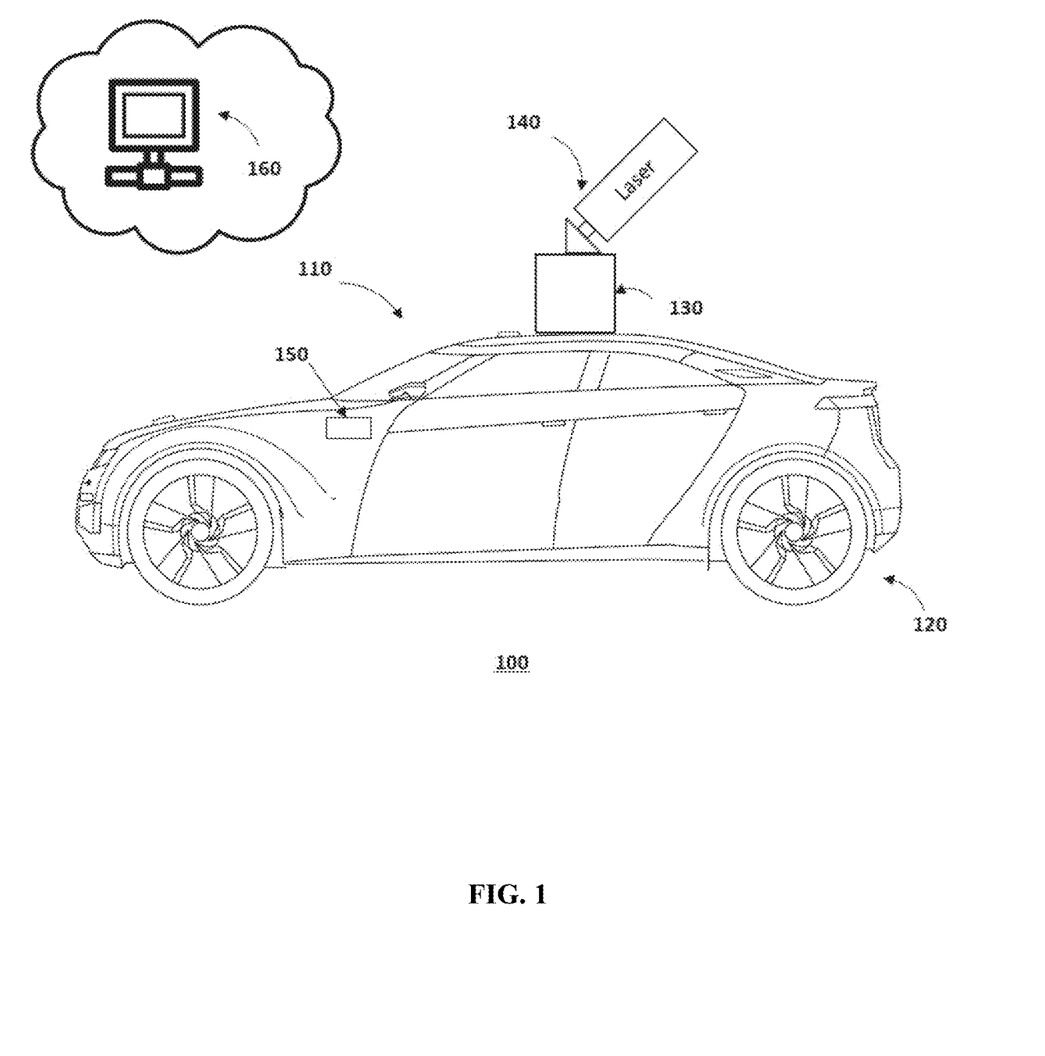
FIG. 1 illustrates a schematic diagram of an exemplary vehicle equipped with sensors, according to embodiments of the disclosure.

FIG. 1 illustrates a schematic diagram of an exemplary vehicle 100 having a plurality of sensors 140 and 150, according to embodiments of the disclosure. Consistent with some embodiments, vehicle 100 may be a survey vehicle configured for acquiring data for constructing a high-definition map or 3-D city modeling. It is contemplated that vehicle 100 may be an electric vehicle, a fuel cell vehicle, a hybrid vehicle, or a conventional internal combustion engine vehicle. Vehicle 100 may have a body 110 and at least one wheel 120. Body 110 may be any body style, such as a sports vehicle, a coupe, a sedan, a pick-up truck, a station wagon, a sports utility vehicle (SUV), a minivan, or a conversion van. In some embodiments, vehicle 100 may include a pair of front wheels and a pair of rear wheels, as illustrated in FIG. 1. However, it is contemplated that vehicle 100 may have more or less wheels or equivalent structures that enable vehicle 100 to move around. Vehicle 100 may be configured to be all wheel drive (AWD), front wheel drive (FWR), or rear wheel drive (RWD). In some embodiments, vehicle 100 may be configured to be operated by an operator occupying the vehicle, remotely controlled, and/or autonomous.

As illustrated in FIG. 1, vehicle 100 may be equipped with a sensor 140 mounted to body 110 via a mounting structure 130. Mounting structure 130 may be an electro-mechanical device installed or otherwise attached to body 110 of vehicle 100. In some embodiments, mounting structure 130 may use screws, adhesives, or another mounting mechanism. Vehicle 100 may be additionally equipped with a sensor 150 inside or outside body 110 using any suitable mounting mechanisms. It is contemplated that the manners in which sensor 140 or 150 can be equipped on vehicle 100 are not limited by the example shown in FIG. 1, and may be modified depending on the types of sensors 140 and 150 and/or vehicle 100 to achieve desirable sensing performance.

In some embodiments, sensors 140 and 150 may be configured to capture data as vehicle 100 travels along a trajectory. Consistent with the present disclosure, sensor 140 may be a LiDAR configured to scan the surrounding and acquire point clouds. LiDAR measures distance to a target by illuminating the target with pulsed laser light and measuring the reflected pulses with a sensor. Differences in laser return times and wavelengths can then be used to make digital 3-D representations of the target. The light used for LiDAR scan may be ultraviolet, visible, or near infrared. Because a narrow laser beam can map physical features with very high resolution, LiDAR is particularly suitable for high-definition map surveys. In some embodiments, a LiDAR may capture a point cloud. Point cloud data may contain a set of data points on the external surfaces of objects around it. A point cloud can be processed to construct a 3-D model of the objects. As vehicle 100 travels along the trajectory, sensor 140 may continuously capture point cloud data. Each set of point cloud data captured at a certain time point is known as a point cloud frame. The point cloud frames may be transmitted to a server 160 in real-time (e.g., by streaming), or collectively after vehicle 100 completes the entire trajectory.

As illustrated in FIG. 1, vehicle 100 may be additionally equipped with sensor 150, which may include sensors used in a navigation unit, such as a GPS receiver and one or more IMU sensors. A GPS is a global navigation satellite system that provides geolocation and time information to a GPS receiver. An IMU is an electronic device that measures and provides a vehicle's specific force, angular rate, and sometimes the magnetic field surrounding the vehicle, using various inertial sensors, such as accelerometers and gyroscopes, sometimes also magnetometers. By combining the GPS receiver and the IMU sensor, sensor 150 can provide real-time pose information of vehicle 100 as it travels, including the positions and orientations (e.g., Euler angles) of vehicle 100 at each time point. Consistent with the present disclosure, sensor 150 may take measurements of pose information at the same time points where sensor 140 captures the point cloud frames. Accordingly, the pose information may be associated with the respective point cloud frames. In some embodiments, the combination of a point cloud frame and its associated pose information may be used to position vehicle 100.

Consistent with the present disclosure, sensors 140 and 150 may communicate with server 160. In some embodiments, server 160 may be a local physical server, a cloud server (as illustrated in FIG. 1), a virtual server, a distributed server, or any other suitable computing device. Consistent with the present disclosure, server 160 may obtain data from sensors 140 and 150. Server 160 may communicate with sensors 140 and 150, and/or other components of vehicle 100 via a network, such as a Wireless Local Area Network (WLAN), a Wide Area Network (WAN), wireless networks such as radio waves, a cellular network, a satellite communication network, and/or a local or short-range wireless network (e.g., Bluetooth™) Server 160 may store a high-definition map. In some embodiments, the high-definition map may be originally constructed using point cloud data acquired by sensor 140.

Consistent with the present disclosure, server 160 may be also responsible for correcting the high-definition map to remove any distortion in the captured point cloud data caused by obstructing objects. In some embodiments, obstructing objects may include any object that blocks the laser path of sensor 140 such that the laser light is reflected by the object before it reaches the road. For example, an obstructing object may be a pedestrian, a temporary booth, or a parked or moving vehicle such as a car, a motorcycle, or a bicycle, etc. Server 160 may separate the point cloud data reflected by obstructing objects from the rest of the point cloud data, estimate the correct point cloud data as if the obstructing objects did not exist, and correct the high-definition map using the estimated point cloud data.

Figure 2:
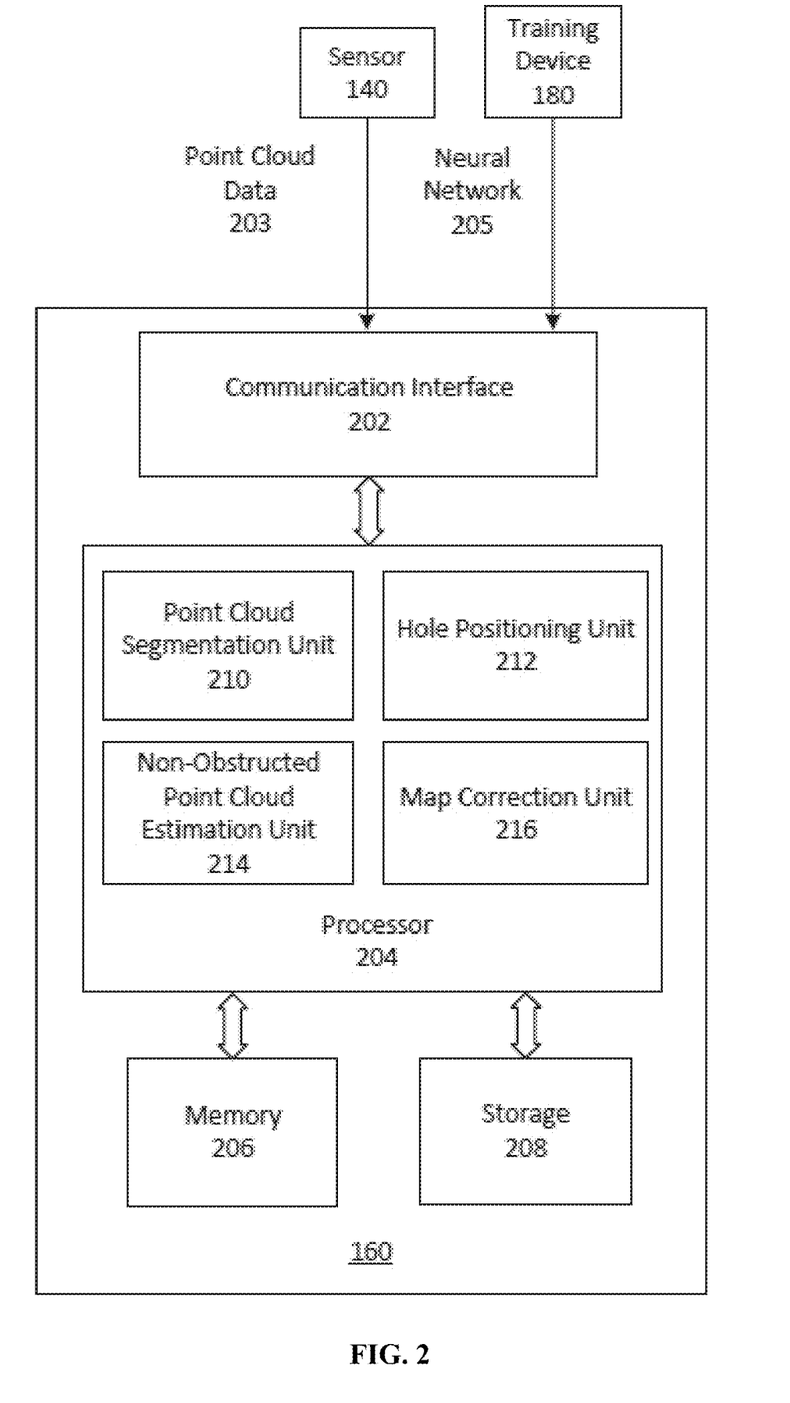
FIG. 2 illustrates a block diagram of an exemplary server for correcting a high-definition map, according to embodiments of the disclosure.

For example, FIG. 2 illustrates a block diagram of an exemplary server 160 for correcting a high-definition map, according to embodiments of the disclosure. In some embodiments, as shown in FIG. 2, server 160 may include a communication interface 202, a processor 204, a memory 206, and a storage 208. In some embodiments, server 160 may have different modules in a single device, such as an integrated circuit (IC) chip, or separate devices with dedicated functions. In some embodiments, one or more components of server 160 may be located in a cloud, or may be alternatively in a single location (such as inside vehicle 100 or a mobile device) or distributed locations. Components of server 160 may be in an integrated device, or distributed at different locations but communicate with each other through a network (not shown).

Communication interface 202 may send data to and receive data from components such as sensors 140 and 150 via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 202 can be an integrated services digital network (ISDN) card, cable modem, satellite modem, or a modem to provide a data communication connection. As another example, communication interface 202 can be a local area network (LAN) card to provide a data communication connection to a compatible LAN. Wireless links can also be implemented by communication interface 202. In such an implementation, communication interface 202 can send and receive electrical, electromagnetic or optical signals that carry digital data streams representing various types of information via a network.

Consistent with some embodiments, communication interface 202 may receive data such as point cloud data 203 captured by sensor 140. In some embodiments, communication interface 202 may also receive pose information (not shown) captured by sensor 150. In some embodiments, communication interface 202 may additionally receive a neural network 205 from training device 180. In some embodiments, training device 180 may have structures similar to those of server 160, including, e.g., a processor, a memory, a storage device, etc. In some embodiments, training device 180 may be part of server 160. Training device 180 may be configured to train neural network 205 using sample data. Neural network 205 may learn to perform a cognitive task during the training process. For example, neural network 205 may be trained to detect obstructing objects based on the point cloud data originally captured by a LiDAR. In some embodiments, neural network 205 may be trained to perform a segmentation task, e.g., to separate the portion of point cloud data 203 associated with the obstructing objects from the rest of point cloud data 203. Consistent with the disclosure, neural network 205 may be any suitable learning model, including but not limited to, convolutional neural network (CNN). In some embodiments, training of neural network 205 may determine one or more model parameters, such as weights, size, shape, and structure of a convolutional kernel.

Communication interface 202 may further provide the received point cloud data 203 and neural network 205 to storage 208 for storage or to processor 204 for processing. Communication interface 202 may also receive a corrected high-definition map created by processor 204, and provide the corrected map to any local component in vehicle 100 or any remote device via a network.

Processor 204 may include any appropriate type of general-purpose or special-purpose microprocessor, digital signal processor, or microcontroller. Processor 204 may be configured as a separate processor module dedicated to correcting the high-definition map. Alternatively, processor 204 may be configured as a shared processor module for performing other functions unrelated to generating and correcting high-definition map.

As shown in FIG. 2, processor 204 may include multiple modules, such as a point cloud segmentation unit 210, a hole positioning unit 212, a non-obstructed point cloud estimation unit 214, a map correction unit 216, and the like. These modules (and any corresponding sub-modules or sub-units) can be hardware units (e.g., portions of an integrated circuit) of processor 204 designed for use with other components or software units implemented by processor 204 through executing at least part of a program. The program may be stored on a computer-readable medium, and when executed by processor 204, it may perform one or more functions. Although FIG. 2 shows units 210-216 all within one processor 204, it is contemplated that these units may be distributed among multiple processors located near or remotely with each other.

Point cloud segmentation unit 210 may be configured to segment received point cloud data 203 to detect one or more obstructing objects. Obstructing object may be a pedestrian, a vehicle, or another object that is in the laser path of sensor 140. In some embodiments, point cloud segmentation unit 210 may be configured to project point cloud data 203 to a two-dimensional (2-D) plane, and accordingly, obtain a 2-D projection image. For example, the 2-D projection image may be an overlook view. In some embodiments, the 2-D projection image may include a number of pixels or superpixels (including a group of adjuvant pixels). Point cloud segmentation unit 210 may further extract various features from the 2-D projection image. Each category of features may correspond to a channel. In some embodiments, point cloud segmentation unit 210 may apply neural network 205 to the extracted features to predicate the attributes of the pixel that indicate how likely the pixel belongs to an obstructing object. For example, attributes may include the distance between the pixel and the center of the obstructing object, the level of confidence, the likelihood of the pixel being part of an obstructing object, and the height of the obstructing object.

Based on the attribute prediction results for the pixels, there may be segments of pixels corresponding to an obstructing object. For example, each segment may include pixels with attributes indicating the pixel as being part of the obstructing object, such as the likelihood being larger than a threshold. In some embodiments, some segments that belong to the same obstructing object may nevertheless be disconnected with each other, and certain gaps may exist among the segments. In some embodiments, point cloud segmentation unit 210 may aggregate those segments by modifying the predication results of the pixels that form the gap.

Point cloud generation unit 210 may then separate the point cloud data corresponding to the obstructing objects from the remaining point cloud data. The remaining point cloud data therefore contain a plurality of holes cause by the obstructing objects. In some embodiments, these holes may later be filled with estimated point cloud data to compensate for the data distortion caused by the obstructing object.

In some embodiments, hole positioning unit 212 may be configured to position the holes in point cloud data 203. In some embodiments, positioning a hole includes determining a plane where the hole is located and a bounding box enclosing the obstructing object. Although in this disclosure, positioning the holes is described, it is contemplated that alternatively the obstructing objects may be positioned instead of the holes, and the achieved functions may be equivalent.

Non-obstructed point cloud estimation unit 214 may estimate point cloud data for filling the holes as if the LiDAR measurements were not blocked by the obstructing objects. In some embodiments, based on the plane position of an obstructing object, laser path may be simulated. The laser path may be then extended beyond the obstructing object to find the point it touches the road. The point cloud data for that point may be estimated.

Map correction unit 216 may be configured to correct high-definition map using the estimated point cloud data. In some embodiments, map correction unit 216 may "repair" the holes with the estimated point cloud data. In some embodiments, the repair is limited within the bounding box enclosing the obstructing object. Repair may include replacing, modifying, re-positioning, or otherwise manipulating the data. In some embodiments, point cloud data 203 may include a plurality of point cloud frames captured as the LiDAR moves along a trajectory. Map correction unit 216 may repair each point cloud frame with the corresponding non-obstructed point cloud data, as described above, and aggregate the repaired point cloud frames. Fusing the repaired point cloud data frames can yield a high-definition map that better covers the areas of holes.

Memory 206 and storage 208 may include any appropriate type of mass storage provided to store any type of information that processor 204 may need to operate. Memory 206 and storage 208 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 206 and/or storage 208 may be configured to store one or more computer programs that may be executed by processor 204 to perform map correction functions disclosed herein. For example, memory 206 and/or storage 208 may be configured to store program(s) that may be executed by processor 204 to correct a high-definition map based on segmenting point cloud data captured by a LiDAR.

Memory 206 and/or storage 208 may be further configured to store information and data used by processor 204. For instance, memory 206 and/or storage 208 may be configured to store the various types of data (e.g., point cloud data, pose information, etc.) captured by sensors 140 and 150 and the high-definition map. Memory 206 and/or storage 208 may also store intermediate data such as neural network 205, and the estimated point clouds, etc. The various types of data may be stored permanently, removed periodically, or disregarded immediately after each frame of data is processed.

Figure 3:
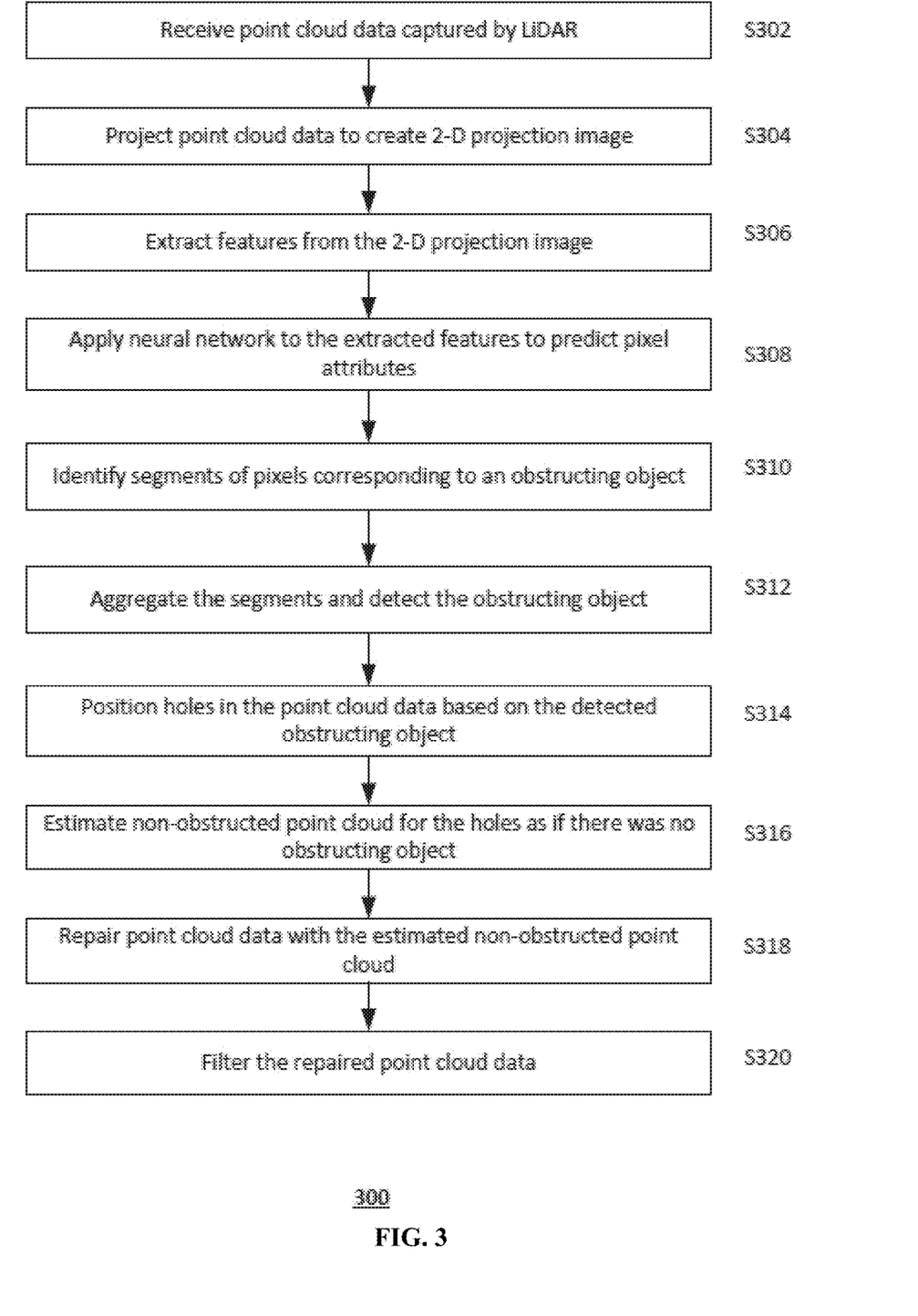
FIG. 3 illustrates a flowchart of an exemplary method for correcting a high-definition map, according to embodiments of the disclosure.

FIG. 3 illustrates a flowchart of an exemplary method 300 for correcting a high-definition map, according to embodiments of the disclosure. In some embodiments, method 300 may be implemented by a map correction system that includes, among other things, server 160. However, method 300 is not limited to that exemplary embodiment. Method 300 may include steps S302-S320 as described below. It is to be appreciated that some of the steps may be optional to perform the disclosure provided herein. Further, some of the steps may be performed simultaneously, or in a different order than shown in FIG. 3.

In step S302, point cloud data captured by sensor 140 may be received. In some embodiments, vehicle 100 may be dispatched for a survey trip to capture data for constructing a high-definition map. As vehicle 100 moves along the trajectory, sensor 140 may capture point cloud data of the surrounding scene. In some embodiments, the point cloud data may consist of multiple frames, each frame being captured at a particular time point when vehicle is at a particular position on the trajectory. Consistent with the present disclosure, there may be other objects on the road that obstruct the laser path of the LiDAR, thus causing distortions in the acquired point cloud data.

In step S304, server 160 may project the 3-D point cloud data received in step S304 onto a plane to create a 2-D projection image. In some embodiments, the projection is vertically downward so that the obtained 2-D projection image is an overlook view. Projecting the 3-D point cloud data into a 2-D image removes the depth information and simplifies the segmentation process.

Steps S306-S312 collectively perform the segmentation of point cloud data to separate the distorted data corresponding to obstructing objects from the remaining, undistorted, point cloud data. In some embodiments, the segmentation may be based on a machine learning model, such as a neural network. A neural network, also known as an artificial neural network, is a computing model simulating a biological neural network to complete a learning task. For example, the neural network is trained to learn which part of point cloud data was acquired from the laser light being reflected by the obstructing objects, rather than the road.

Figure 4:
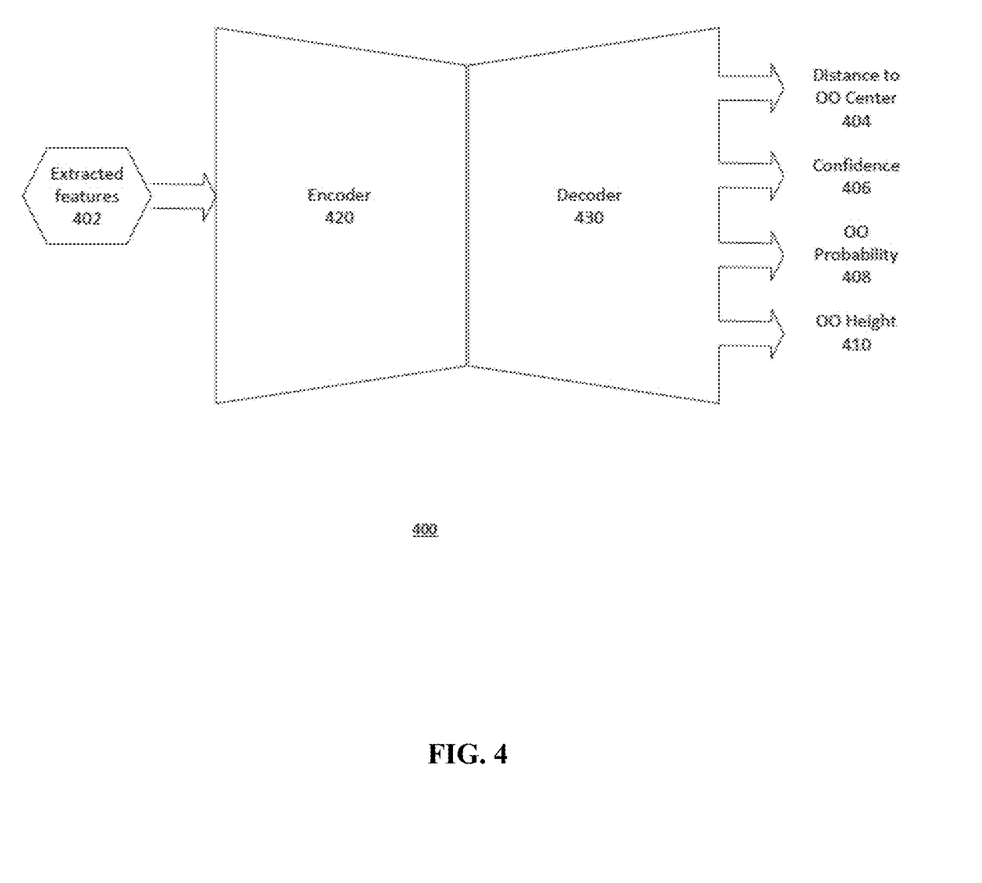
FIG. 4 illustrates an exemplary convolutional neural network (CNN) used to segment point cloud data, according to embodiments of the disclosure.

FIG. 4 illustrates an exemplary CNN 400 used to segment point cloud data, according to embodiments of the disclosure. In some embodiments, CNN 400 may include an encoder 420 and a decoder 430. Each of encoder 420 and decoder 430 may include multiple distinct layers (not shown). Examples of the different layers may include one or more convolutional layers, non-linear operator layers (such as rectified linear units (ReLu) functions, sigmoid functions, or hyperbolic tangent functions), pooling or subsampling layers, fully connected layers, and/or final loss layers. Each layer may connect one upstream layer and one downstream layer. The input may be considered as an input layer, and the output may be considered as the final output layer.

To increase the performance and learning capabilities of CNN models, the number of different layers can be selectively increased. The number of intermediate distinct layers from the input layer to the output layer can become very large, thereby increasing the complexity of the architecture of the CNN model. CNN models with a large number of intermediate layers are referred to as deep CNN models. For example, some deep CNN models may include more than 20 to 30 layers, and other deep CNN models may even include more than a few hundred layers. Examples of deep CNN models include AlexNet, VGGNet, GoogLeNet, ResNet, etc.

As used herein, a CNN model used by the disclosed segmentation method may refer to any neural network model formulated, adapted, or modified based on a framework of convolutional neural network. For example, a CNN model used for segmentation in embodiments of the present disclosure may selectively include intermediate layers between the input and output layers, such as one or more deconvolution layers, up-sampling or up-pooling layers, pixel-wise predicting layers, and/or copy and crop operator layers.

Returning to FIG. 3, in step S306, server 160 may extract features from each pixel of the 2-D projection image. Examples of features extracted may include the pixel value, texture around the pixel, contrast with adjacent pixels, relative position of the pixel in the image, etc. CNN 400 may receive extracted features 402 as input. In some embodiments, the features may be arranged as a W*H*C matrix, where W is the pixel row numbers, H is the pixel column numbers, and C is the channel feature number.

In step S308, CNN 400 may be applied to the extracted features to predict pixel attributes. For example, attributes may include the distance 404 between the pixel and the center of the obstructing object, the level of confidence 406, the probability 408 indicating a likelihood of the pixel being part of an obstructing object, and the height of the obstructing object 410.

In step S310, server 160 may identify segments including pixels with attributes indicating the pixel as being part of the obstructing object. In some embodiments, the attributes may be compared to some predetermined threshold to determine if a pixel should be classified as the obstructing object. For example, a pixel with probability 408 being 95% may be classified as being part of the obstructing object, after comparing with a threshold of 90%. Alternatively or additionally, a pixel with distance 404 to the center of the obstructing object being shorter than a threshold of 5 pixel widths may be labeled as being part of the obstructing object.

The pixel-by-pixel prediction may sometimes result in adjacent but disconnected segments. For example, there may be a few sporadic non-obstructing-object pixels or a small gap between two otherwise connected segments. In step S312, server 160 may aggregate these segments by modifying the predication results of those pixels in the gap. For example, the pixel-by-pixel prediction may find one segment corresponding to a pedestrian's head, and an adjacent segment corresponding to her trunk. However, pixels of the pedestrian's neck area may be initially predicted as not part of the obstructing object, because, e.g., certain attributes of those pixels do not satisfy the criteria to classify them as corresponding to the obstructing object. However, through aggregation, the head segment and the trunk segment may be connected, by modifying the pixels between the segments as corresponding to the obstructing object.

Because of the obstructing objects, holes are left in the point cloud data. In step S314, server 160 may position the holes based on the detected obstructing objects. In some embodiments, server 160 may first determine a bounding box for the obstructing object, i.e., boundary of the corresponding hole. Server 160 may further determine a first plane for the point cloud just outside the bounding box. In the meantime, server 160 determines a second plane of the point cloud data near the original (where sensor 140 is located) (the "reference plane"), and determines an angle between the first and second planes. If the angle is smaller than a threshold, server 160 sets the first plane as the object plane.

Figure 5:
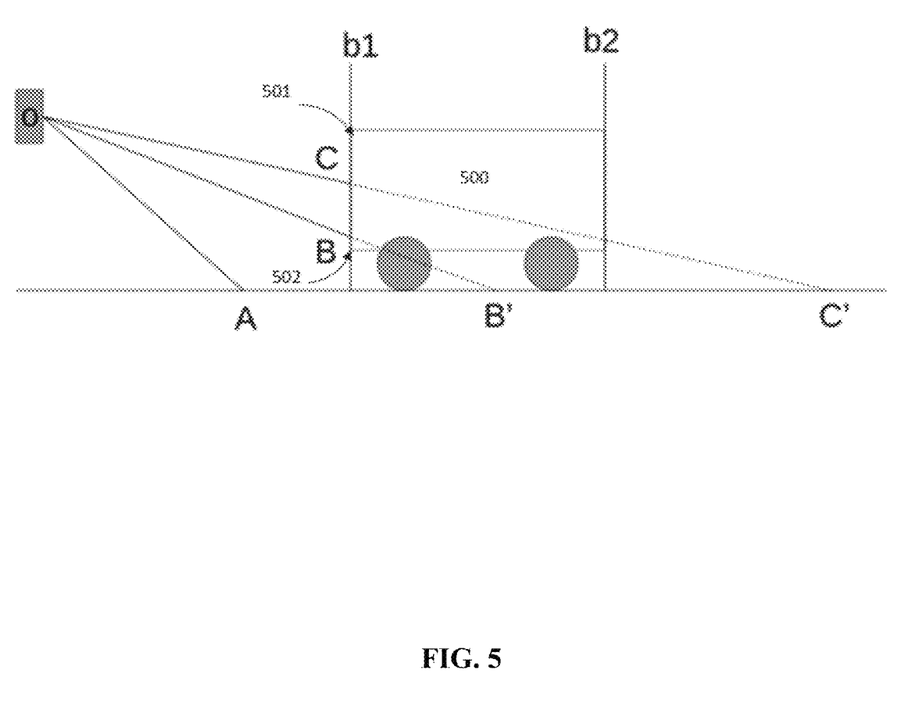
FIG. 5 illustrates an exemplary method to estimate non-obstructed point cloud data, according to embodiments of the disclosure.

In step S316, server 160 may estimate non-obstructed point cloud data for the holes as if there was no obstructing object. FIG. 5 illustrates an exemplary method to estimate non-obstructed point cloud data, according to embodiments of the disclosure. As shown in FIG. 5, a vehicle 500 may be between plane b1 and plane b2. Laser light is emitted by a LiDAR at origin O. When there is no obstructing object in the laser path, it will hit the road, and reflected by the road, e.g., at point A. Due to the existence of vehicle 500, the laser path may hit point B in plane b1 and gets reflected by vehicle 500. Without vehicle 500, the laser path OB would have been extended and eventually hit the road at point B'. Similarly, another laser path may hit plane b1 at point C, and once extended, it will hit the road at point C'. Accordingly, the acquired point cloud data corresponding points C and B may be used to estimate the non-obstructed point cloud data corresponding to points C' and B'. In some embodiments, each point within the object bounding box (between point 501 and point 502) in plane b1 may find a corresponding point on the road. Accordingly, the acquired point data from plane b1 may be assigned to or otherwise used to estimate the non-obstructed point cloud data for the corresponding point on the road.

In step S318, server 160 may use the estimated non-obstructed point cloud data to repair the holes. For example, the corresponding non-obstructed point cloud data may be used to fill in the holes, or otherwise to modify the data of the holes. In step S320, the repair may be filtered by the object bounding box. For example, as shown in FIG. 5, the hole being repaired is limited to a projection of the object bounding box (between point 501 and point 502) onto the road. Filtering the repair may reduce noise and improve the correction result.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for correcting a high-definition map, comprising:
   a communication interface configured to receive point cloud data of a scene captured by a LiDAR;
   a storage configured to store the point cloud data; and
   at least one processor, configured to:
      detect at least one obstructing object from the point cloud data using a neural network comprising at least a threshold number of layers to segment the point cloud data by identifying segments of pixels in the point cloud data corresponding to the at least one obstructing object, wherein the at least one obstructing object obstructs a portion of the scene from the LiDAR;
      position at least one hole corresponding to the obstructed portion of the scene in the point cloud data of the scene based on separating point cloud data corresponding to the at least one obstructing object from the point cloud data of the scene;
      estimate non-obstructed point cloud data for the at least one hole as if the scene was captured without the at least one obstructing object; and
      correct the high-definition map by repairing the received point cloud data with the non-obstructed point cloud data.

2. The system of claim 1, wherein the storage is configured to store the neural network.

3. The system of claim 2, wherein the neural network is a convolutional neural network.

4. The system of claim 2, wherein the at least one processor is further configured to:
   create a 2-D projection image based on the point cloud data, the 2-D projection image including a plurality of pixels; and
   determine a plurality of attributes associated with each pixel using the neural network, the attributes indicative of a likelihood of the pixel being corresponding to the at least one obstructing object.

5. The system of claim 4, wherein the at least one processor is further configured to:
   identify segments from the 2-D projection image, each segment including pixels with attributes indicating that the pixels correspond to one of the at least one obstructing object; and determine an aggregated area in the 2-D projection image, wherein the aggregated area encloses all the identified segments.

6. The system of claim 1, wherein to position at least one hole in the point cloud data, the at least one processor is further configured to:
determine a plane in which each hole is located; and
determine a boundary for each hole.

7. The system of claim 6, wherein the at least one processor is further configured to estimate the non-obstructed point cloud data based on the plane of the hole.

8. The system of claim 1, wherein the received point cloud data includes a plurality of point cloud frames captured as the LiDAR moves along a trajectory, and the at least one processor is configured to:
repair each point cloud frame with the corresponding non-obstructed point cloud data; and
aggregate the repaired point cloud frames.

9. A method for correcting a high-definition map, comprising:
receiving, through a communication interface, point cloud data of a scene captured by a LiDAR;
detecting, by at least one processor, at least one obstructing object from the point cloud data using a neural network comprising at least a threshold number of layers to segment the point cloud data by identifying segments of pixels in the point cloud data corresponding to the at least one obstructing object, wherein the at least one obstructing object obstructs a portion of the scene from the LiDAR;
positioning, by the at least one processor, at least one hole corresponding to the obstructed portion of the scene in the point cloud data of the scene based on separating point cloud data corresponding to the at least one obstructing object from the point cloud data of the scene;
estimating, by the at least one processor, non-obstructed point cloud data for the at least one hole as if the scene was captured without the at least one obstructing object; and
correcting, by the at least one processor, the high-definition map by repairing the received point cloud data with the non-obstructed point cloud data.

10. The method of claim 9, wherein the neural network is a convolutional neural network.

11. The method of claim 9, further comprising:
creating a 2-D projection image based on the point cloud data, the 2-D projection image including a plurality of pixels; and
determining a plurality of attributes associated with each pixel using the neural network, the attributes indicative of a likelihood of the pixel being corresponding to the at least one obstructing object.

12. The method of claim 11, further comprising:
identifying segments from the 2-D projection image, each segment including pixels with attributes indicating that the pixels correspond to one of the at least one obstructing object; and
determining an aggregated area in the 2-D projection image, wherein the aggregated area encloses all the identified segments.

13. The method of claim 9, wherein positioning at least one hole in the point cloud data further comprises:
determining a plane in which each hole is located; and
determining a boundary for each hole.

14. The method of claim 13, wherein the non-obstructed point cloud data is estimated based on the plane of the hole.

15. The method of claim 1, wherein the received point cloud data includes a plurality of point cloud frames captured as the LiDAR moves along a trajectory, and wherein correcting the high-definition map further comprises:
repairing each point cloud frame with the corresponding non-obstructed point cloud data; and
aggregating the repaired point cloud frames.

16. A non-transitory computer-readable medium having a computer program stored thereon, wherein the computer program, when executed by at least one processor, performs a method for correcting a high-definition map, the method comprising:
receiving point cloud data of a scene captured by a LiDAR;
detecting at least one obstructing object from the point cloud data using a neural network comprising at least a threshold number of layers to segment the point cloud data by identifying segments of pixels in the point cloud data corresponding to the at least one obstructing object, wherein the at least one obstructing object obstructs a portion of the scene from the LiDAR;
positioning at least one hole corresponding to the obstructed portion of the scene in the point cloud data of the scene based on separating point cloud data corresponding to the at least one obstructing object from the point cloud data of the scene;
estimating non-obstructed point cloud data for the at least one hole as if the scene was captured without the at least one obstructing object; and
correcting the high-definition map by repairing the received point cloud data with the non-obstructed point cloud data.

17. The non-transitory computer-readable medium of claim 16, wherein the method further comprises:
creating a 2-D projection image based on the point cloud data, the 2-D projection image including a plurality of pixels; and
determining a plurality of attributes associated with each pixel using the neural network, the attributes indicative of a likelihood of the pixel being corresponding to the at least one obstructing object.

18. The non-transitory computer-readable medium of claim 17, wherein the method further comprises:
identifying segments from the 2-D projection image, each patch including pixels with attributes indicating that the pixels correspond to one of the at least one obstructing object; and
determining an aggregated area in the 2-D projection image, wherein the aggregated area encloses all the identified segments.

19. The non-transitory computer-readable medium of claim 16, wherein positioning at least one hole in the point cloud data further comprises:
determining a plane in which each hole is located; and
determining a boundary for each hole,
wherein the non-obstructed point cloud data is estimated based on the plane of the hole.

* * * * *